United States Patent [19]

Takahashi et al.

[11] Patent Number: 5,763,096
[45] Date of Patent: Jun. 9, 1998

[54] FILM HAVING A GOOD ADHESIVE PROPERTY AND PROCESS FOR PRODUCING THE SAME

[75] Inventors: Kohzo Takahashi; Masahiro Kimura; Takashi Mimura, all of Otsu, Japan

[73] Assignee: Toray Industries, Inc., Japan

[21] Appl. No.: 611,483

[22] Filed: Mar. 5, 1996

[30] Foreign Application Priority Data

Mar. 8, 1995 [JP] Japan ................................. 7-078277
Mar. 14, 1995 [JP] Japan ................................. 7-083287

[51] Int. Cl.⁶ ....................................................... B32B 27/06
[52] U.S. Cl. ............................ 428/480; 428/482; 428/483
[58] Field of Search ................................. 428/480, 482, 428/483

[56] References Cited

FOREIGN PATENT DOCUMENTS 5-152159  6/1993  Japan.
7-11428   1/1995  Japan.

Primary Examiner—Edward J. Cain
Attorney, Agent, or Firm—Austin R. Miller

[57] ABSTRACT

Disclosed is a film having a good adhesive property comprising a base film and a coated layer formed on at least one surface of the base film. The coated layer comprises a mixture whose main constituents are a polyester resin and a melamine compound, and not less than 60% by weight of constituents forming the coated layer is the polyester resin. Or the concentration of a carboxylic acid of the surface of the coated layer is not less than 0.005 and the concentration of a primary amine of the surface of the coated layer is not less than 0.0015. The film having such a coated layer can indicate an excellent adhesive property for a deposited layer under a high-moisture condition, particularly, in water, and an excellent adhesive property for a printing ink.

37 Claims, No Drawings

FILM HAVING A GOOD ADHESIVE PROPERTY AND PROCESS FOR PRODUCING THE SAME

BACKGROUND OF THE INVENTION

1. Field of the Invention

The present invention relates to a film having a good adhesive property and a process for producing the same, and more specifically to a film having a good adhesive property which is excellent in adhesion to a deposited layer, particularly under a high-moisture condition, and excellent adhesion to a printing ink, and which is suitable to films used for package materials, electric insulating materials and other general industrial materials, and further relates to a process for producing such an adhesive film.

2. Description of the Prior Art

As a method for providing adhesion to a printing ink or a deposited layer to a base film, it is known to apply a corona discharge treatment, or to blend a low-crystallinity polyester and a high-crystallinity polyester (for example, JP-B-SHO 64-10188), or to form an under-coating layer for a printing ink layer or a deposited layer using a urethane resin, an acrylic resin or a copolymerized polyester resin.

In such conventional technologies, however, a sufficient adhesive property or processing property has not been obtained in any method. For example, in a case where a deposited film is used as a package film, various films, for example, a heat seal film is laminated on the surface of the deposited layer via a good adhesive layer (a layer having a good adhesive property), and the laminated film is served to package formation. In such a case, there is a problem that the laminated film is easily delaminated at an interface between the base film and the deposited layer when the laminated film is placed in water. Further, there is a similar problem in uses applied with a printing ink.

SUMMARY OF THE INVENTION

Accordingly, an object of the present invention is to provide a film having a good adhesive property which has excellent adhesion under a high-moisture condition, particularly, adhesion with a deposited layer in water, as well as excellent in adhesive property with printing ink and in finish state of printing, and further relates to a process for producing the same.

In the present invention, as the result of earnest investigation and research with respect to a coated layer provided on a base film as an under-coating layer for printing ink or deposited layer, it has been found that an excellent adhesive property with a printing ink and a deposited layer can be realized by providing a coated layer having a specified constitution on a base film.

A film having a good adhesive property according to the present invention comprises a base film, and a coated layer formed on at least one surface of the base film. The coated layer comprises a mixture whose main constituents are a polyester resin and a melamine compound, and not less than 60% by weight of constituents forming the coated layer is the polyester resin.

Further, a film having a good adhesive property according to the present invention comprises a base film, and a coated layer formed on at least one surface of the base film, and the concentration of a carboxylic acid of the surface of the coated layer is not less than 0.005 and the concentration of a primary amine of the surface of the coated layer is not less than 0.0015.

Further, a process for producing a film having a good adhesive property according to the present invention comprises the steps of applying a coating material on at least one surface of a base film which has not yet been oriented and crystallized, the coating material comprising a mixture whose main constituents are a polyester resin and a melamine compound; and orienting and crystallizing the base film with a coated layer by stretching the base film with the coated layer in at least one direction and heat treating it.

Furthermore, a process for producing a film having a good adhesive property according to the present invention comprises the steps of applying a coating material on at least one surface of a base film which has not yet been oriented and crystallized; and orienting and crystallizing the base film with a coated layer by stretching the base film with the coated layer in at least one direction and heat treating it, as well as forming a coated layer having a concentration of a carboxylic acid at its surface of not less than 0.005 and a concentration of a primary amine at its surface of not less than 0.0015.

In the above-described films having a good adhesive property, an excellent adhesive property with a deposited layer under a high-moisture condition, particularly, with a deposited layer in water can be obtained, and an excellent adhesive property with a printing ink also can be obtained.

DETAILED DESCRIPTION OF THE PREFERRED EMBODIMENTS

Further objects, features, and advantages of the present invention will be understood from the detailed description of the preferred embodiments of the present invention.

In the present invention, although the material of a base film is not particularly restricted, it is preferably a polyester film composed of a polyester resin composition. In the present invention, polyester of a polyester film means a generic term of a polymer whose main chain is composed of ester bonding. As a polyester used in the present invention, polyethylene terephthalate, polyethylene 2,6-naphthalate, polybutylene terephthalate, polyethylene$\alpha$, $\beta$-bis(2-chlorophenoxy)ethane-4,4'-dicarboxylate, etc. are particularly preferred. Among these, polyethylene terephthalate and polyethylene 2,6-naphthalate are preferred from the viewpoint of quality and economy, and particularly polyethylene terephthalate is preferred. Therefore, hereinafter, the present invention will be explained using polyethylene terephthalate (hereinafter, referred to as "PET") as a typical polyester.

PET has a repeated unit of ethylene terephthalate at a content of not less than 70 mol %, preferably not less than 80 mol %, more preferably not less than 90 mol %. As long as this condition is maintained, other dicarboxylic components and diol components may be copolymerized. For example, polyethylene terephthalate copolymerized with isophthalic acid can be employed, but, of course, it is not limited to this.

Further, a generally used additive such as thermal stabilizer, oxidation inhibitor, weather resistance stabilizer, ultraviolet absorbent, organic lubricant, pigment, dye, organic or inorganic particles, filler and seed agent may be added as long as the advantages according to the present invention are not damaged.

Further, in order to improve the handling ability and processing ability of the film according to the present invention, it is preferred that particles having a mean particle diameter of 0.1 to 10 μm selected freely from internally formed particles or externally added particles such as inorganic particles and/or organic particles are present in the base film at a content of 0.01 to 10% by weight, and more preferably, internally formed particles, inorganic particles and/or organic particles having a mean particle diameter of 0.1 to 5 μm are present at a content of 0.01 to 3% by weight.

As a method for precipitating internally formed particles, known methods such as ones disclosed in JP-A-SHO 48-61556, JP-A-SHO 51-12860, JP-A-SHO 53-41355 and JP-A-SHO 54-90397 can be employed. Further, other particles can be used together as disclosed in JP-A-SHO 55-20496 and JP-A-SHO 59-204617. Use of particles having a mean particle diameter more than 10 μm is not preferred because defects of a film are liable to occur. As the inorganic particles and/or organic particles used, for example, inorganic particles such as wet or dry silica particles, colloidal silica particles, titanium oxide particles, calcium carbonate particles, calcium phosphate particles, barium sulfate particles, alumina particles, maica, kaolin and clay and organic particles such as particles comprising stylene, silicone, acrylic acid etc. can be employed. Among these particles, particularly, inorganic particles such as wet and dry colloidal silica particles and alumina particles, and organic particles such as particles comprising stylene, silicone, acrylic acid, methacrylic acid, polyester or divinylbenzene are preferred. Two or more kinds of internally formed particles, inorganic particles and/or organic particles may be used together.

In the present invention, the center line average roughness Ra of the surface of the film after formation of a coated layer is preferably in the range of 0.005 to 0.08 μm, more preferably in the range of 0.008 to 0.06 μm. Further, the ratio of maximum roughness Rt to center line average roughness Ra "Rt/Ra" is preferably in the range of 10 to 50, and by this, the handling ability, the processing ability and the adhesive property can be all improved. If Rt/Ra is less than 10, the handling ability decreases and the film is likely to be damaged. If Rt/Ra is more than 50, partial missing of a deposited layer or an ink layer occurs or the handling ability decreases because of excessive slipping property, and further the adhesive property also decreases. Further, with respect to the other surface on which a coated layer is not formed, the handling ability and processing ability thereof increases by controlling the surface roughness within the above-described range.

The intrinsic viscosity of the above-described polyester film determined in orthochlorophenol at 25° C. is preferably in the range of 0.40 to 1.20 dl/g, more preferably in the range of 0.50 to 0.85 dl/g, and such a polyester film is suitable to the present invention.

Further, from the viewpoint of improvement of adhesive property with a coated layer, the amount of a carboxylic end group of a polyester film which is a base film for the coated layer is preferably not less than 37 eq/t, more preferably not less than 40 eq/t.

In a PET film using the above-described PET, preferably the film is biaxially oriented in the condition where a coated layer is laminated. The biaxially oriented PET film means a film which is made by stretching a non-stretched PET sheet or film at a stretching ratio of 2.5 to 5 times in the longitudinal and transverse directions, respectively, and which indicates a biaxially oriented pattern in a wide angle X-ray diffraction.

The thickness of the PET film is not particularly restricted, and it may be selected freely depending upon uses thereof, but it is preferably in the range of 0.1 to 1,000 μm, more preferably in the range of 0.5 to 500 μm.

In the present invention, it is necessary that a coated layer is formed on at least one surface of a base film. As a resin coated on the surface of a base film, for example, a polyester resin or an acrylic resin can be used. From the viewpoint of coating on a PET film and thermal resistance, it is preferred that the coated resin contains a polyester resin. Further, it is preferred that not less than 60% by weight, preferably not less than 80% by weight, of the constituents forming the coated layer is the polyester resin.

As a method for forming a coated layer, a method for coating a resin on a surface of a base film such as laminating melt-extrusion, hot-melt coating, or in-line or off-line coating using a solvent other than water, a resin soluble to water and/or a resin dispersible in water, or a method for laminating a material having a similar composition or a blended material on a surface of a base film, can be employed. Among these methods, an inline-coating method for applying a coating material on at least one surface of a base film before finishing of orientation and crystallization, stretching the film in at least one direction, heat treating the film, and thereby finishing the orientation and the crystallization thereof is preferred from the viewpoint of formation of uniform coated layer and industrial production. Such an in-line coating can be performed using a known method, and it is not particularly restricted. It is preferred that a surface treatment such as a corona discharge treatment is performed before the coating from the viewpoint of adhesion of the coating material to the base film.

A polyester resin forming a coated layer in the present invention is a resin having an ester bond in the main chain or the side chain, and such a polyester resin can be selected freely from known polyester resins. As to the acid component, a dicarboxylic acid containing a sulfonic group such as sulfoisophthalic acid, 5-sulfoisophthalic acid, 2-sulfoisophthalic acid, 4-sulfoisophthalic acid or 4-sulfonaphthalene-2,6-dicarboxylic acid is preferred from the viewpoint of adhesive property. The content of a sulfonic group is preferably not more than 0.5 mol %. If sulfonic group is contained at a content more than 0.5 mol %, not only the adhesive property with a deposited layer under a high-moisture condition or in water decreases but also the solvent resistance decreases. As a carboxylic acid component which does not contain a sulfonic group, aromatic, aliphatic or cycloaliphatic dicarboxylic acid or polyfunctional carboxylic acid of not less than trivalent acid can be used. As such an aromatic dicarboxylic acid, terephthalic acid, isophthalic acid, orthophthalic acid or 2,6-naphthalene dicarboxylic acid can be used. The content of such an aromatic dicarboxylic acid is preferably not less than 30 mol %, more preferably not less than 35 mol %, further more preferably not less than 40 mol % relative to the total dicarboxylic acid component. If the content is less than 30 mol %, the mechanical properties and the water resistance of the polyester copolymer decrease. As the aliphatic and cycloaliphatic dicarboxylic acids, succinic acid, adipic acid, sebacic acid, dodecanedioic acid, dimer acid, 1,3-cyclopentane dicarboxylic acid, 1,2-cyclohexane dicarboxylic acid or 1,4-cyclohexane dicarboxylic acid can be used.

As the glycol component, ethylene glycol, diethylene glycol, polyethylene glycol, propylene glycol, polypropylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, neopentyl glycol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexane dimethanol, 1,3-cyclohexane dimethanol, 1,4-cyclohexane dimethanol, 2,2,4,4-tetramethyl-1,3-cyclobutanediol, 4,4'-(2-norbornylidene)diphenol, 4,4'- dihydroxybiphenol, o-, m- and p-dihydroxybenzene, 4,4'-isopropylidene phenol, 4,4'-isopropylidene bindiol, cyclopentane-1,2-diol, cyclohexane-1,2-diol and cyclohexane-1,4-diol can be used.

As the polyfunctional dicarboxylic acid, for example, trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid, 1,2,3,4-pentanetetracarboxylic acid, 3,3',4,4'-benzophenonetetracarboxylic acid, 5-(2,5-dioxotetrahydrofurfuryl)-3-methyl-3-cyclohexene-1,2-dicarboxylic acid, 5-(2,5-dioxythotetrahydrofurfuryl)-3-cyclohexene-1,2-dicarboxylic acid, cyclopentanetetracarboxylic acid, 2,3,6,7-naphthalenetetracarboxylic acid, 1,2,5,6-naphthalenetetracarboxylic acid, ethylene glycol bistrimellitate, 2,2',3,3'-diphenyltetracarboxylic acid, thiophene-2,3,4,5-tetracarboxylic acid and ethylenetetracarboxylic acid can be used. Among these, trimellitic acid, pyromellitic acid, 5-(2,5-dioxotetrahydrofurfuryl)-3-methyl-3-cyclohexene-1,2-dicarboxylic acid, etc. can be preferably used.

Particularly, trimellitic acid is preferred from the viewpoint of adhesive property, dispersion in water, solution to water and thermal resistance, and, in particular, trimellitic acid is preferably contained at a content of 1 to 25 mol % in a polyester resin. If the content is more than 25 mol %, the film formation of the coated layer becomes unstable, and if the content is less than 1 mol %, the advantages aimed in the present invention can be hardly obtained.

The glass transition temperature of a polyester resin forming a coated layer is preferably in the range of 0° C. to 80° C. If less than 0° C., the thermal resistance is insufficient, and if more than 80° C., the stretching property of the coated layer deteriorates.

In the present invention, the acid value of a polyester resin forming a coated layer is preferably not less than 20 KOH mg/g, more preferably not less than 25 KOH mg/g. If less than 20 KOH mg/g, an adhesive property under a high-moisture condition, particularly an adhesive property with a deposited layer in water, aimed in the present invention becomes insufficient.

In the present invention, an acrylic resin also can be used for a coated layer. In the present invention, an acrylic resin can be selected freely from known acrylic resins. Such an acrylic resin can be produced by a known method, and the monomer component thereof can be raised as follows, but the monomer component is not particularly restricted. For example, a monomer served to polymerization of an acrylic resin has a basic structure of an alkylacrylate or an alkylmethacrylate (as the alkyl group, a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, etc. can be used), and is copolymerized with monomers having the following functional groups in order to provide a functional group. As such a functional group, a carboxylic group, a methylol group, an acid anhydride, a sulfonic group, an amide group or an alkylol-modified amide group, an amino group (including a substitutional amino group) or an alkylol-modified amino group, a hydroxyl group and an epoxy group can be used, and a salt and a ester compound of these groups may be copolymerized.

As a compound having a carboxylic group or a salt thereof or an acid anhydride, acrylic acid, methacrylic acid, itaconic acid, maleic acid, fumaric acid, crotonic acid and an alkali metallic salt, an ammonium salt or an anhydride of theses carboxylic acids can be used.

As a compound having an amide group or an alkylol-modified amide group, acrylic amide, methacrylic amide, N-methylmethacrylic amide, methylol-modified acrylic amide, methylol-modified methacrylic amide, ureidovinylether, β-ureidoisobutylvinylether, ureidoethylacrylate, etc. can be used.

As a compound having an amino group or an alkylol-modified amino group, diethylaminoethylvinylether, 2-aminoethylvinylether, 3-aminopropylvinylether, 2-aminobutylvinylether, dimethylaminoethylmethacrylate, dimethylaminoethylvinylether, and a compound which is prepared by modifying the amino group of these compounds to a methylol or a compound which is prepared by modifying these compounds to a tetrasalt by an alkyl halide, dimethyl sulfate or sultone, etc. can be used.

In the present invention, the melamine compound forming a coated layer may be melamine, or a methylol modified melamine derivative prepared by condensation of melamine and formaldehyde, or a compound partially or completely etherified by reaction of a lower alcohol with a methylol modified melamine, and a mixture thereof can be used. A melamine resin may be either a monomer or a condensate of a polymer comprising a dimer or more, and further, a mixture thereof may be employed. As a lower alcohol used for the etherification, methylalcohol, ethylalcohol, isopropylalcohol, n-butanol, isobutanol, etc. can be used, but it is not particularly restricted by these alcohols.

Although a compound prepared by partially etherifying a methylol modified melamine derivative or a mixture thereof is preferred in the present invention, the compound to be used is not particularly restricted to this.

In the present invention, the melamine based compound is contained preferably at a content of 0.01 to 30% by weight of the constituents forming a coated layer, more preferably at a content of 0.05 to 20% by weight. If less than 0.01% by weight, the advantage of improvement of adhesive property cannot be obtained. If more than 30% by weight, the stretching property of the coated layer becomes poor and a stable coated layer can be hardly formed.

In the present invention, the concentration of a carboxylic acid of a surface of a coated layer is not less than 0.005. It is preferably in the range of 0.006 to 0.20, more preferably in the range of 0.007 to 0.050. If it is less than 0.005, the adhesive property aimed in the present invention becomes poor. On the other hand, if the concentration is too great, the adhesive property also decreases.

For achieving a concentration of carboxylic acid on a surface of a coated layer of not less than 0.005 in the present invention, coating a resin having a large amount of carboxylic acid in an end or side chain of the resin on a surface of a base film (laminating melt-extrusion, hot-melt coating, or in-line or off-line coating using a solvent other than water, a resin soluble to water and/or a resin dispersible in water), or for laminating a material having a similar composition or a blended material on a surface of a base film, can be employed.

For obtaining a resin having a large amount of carboxylic acid in an end or side chain of the resin, a method for preparing such a resin from a resin copolymerized with a polyfunctional carboxylic acid having a three or more acid value, for example, as disclosed in JP-A-SHO 54-46294, JP-A-SHO 60-209073, JP-A-SHO 62-240318, JP-A-SHO 53-26828, JP-A-SHO 53-26829, JP-A-SHO 53-98336, JP-A-SHO 56-116718 and JP-A-SHO 61-124684, can be employed. Further, although a method other than these methods may be employed, polyester resins aforementioned which can form a coated layer may be preferred.

The concentration of a primary amine of a surface of a coated layer is not less than 0.0015 in the present invention. It is preferably not less than 0.00155, more preferably not less than 0.0016. If it is less than 0.0015, the adhesive property under a high-moisture condition desired in the present invention becomes poor.

Although a method for obtaining a concentration of a primary amine of not less than 0.0015 on at least one surface in the present invention is not particularly restricted as long as this condition can be satisfied, a method for coating a resin having a much amount of an amine in an end or side chain of the resin and/or a resin creating an amine by treatment such as heat treatment on a surface of a base film (laminating melt-extrusion, hot-melt coating, or in-line or off-line coating using a solvent other than water, a resin soluble to water and/or a resin dispersible in water), or a method for laminating a material having a similar composition or a blended material on a surface of a base film, can be employed. As the resin coated on the surface, a urea-based, melamine-based, acrylic amide-based or polyamide-based compound and metylol modified or methylmetylol modified compounds thereof can be used. Although such a compound is not particularly restricted, a melamine-based compound is preferred from the viewpoint of coating on a PET film, thermal resistance, application property and adhesive property. Further, if the above-described melamine compound is added, the content thereof in a coated layer is preferably in the range of 0.01 to 30% by weight, more preferably in the range of 0.05 to 20% by weight, from the viewpoint of film formation.

As a method for achieving a concentration of a carboxylic acid of not less than 0.005 and a concentration of a primary amine of not less than 0.0015 of the surface of a coated layer, there is a method for blending a polyester resin or an acrylic resin and an amide compound or a melamine compound. However, the method is not particularly restricted to this method.

In the present invention, in a case where a coated layer is formed by a polyester resin and a melamine compound, the polyester resin (A) and the melamine compound (B) can be blended at a freely selected ratio. The ratio (A)/(B) by weight is preferably in the range of 999/1 to 60/40, more preferably in the range of 99/1 to 80/20, and further more preferably in the range of 99/1 to 90/10. In this case, a part of, or the whole of the polyester resin and the melamine compound may be reacted, and they may not be reacted. In a case where either a polyester resin or a melamine compound is not contained, the adhesive property under a high-moisture condition, particularly, the adhesive property with a deposited layer in water becomes insufficient.

In the present invention, although a coating material forming a coated layer may be applied on a biaxially oriented polyester film, it is preferred that the coating material is applied on a polyester film before finishing of orientation and crystallization and thereafter the coated film is dried, stretched and heat treated to finish the orientation and crystallization, namely, the coated layer is formed in a process for producing a biaxially oriented polyester film, from the viewpoint that pinholes in an ink layer or a deposited layer due to sticking of dust or foreign materials in the process or that a thin coated layer can be uniformly formed. In a case where a coated layer is formed by this method, it is preferred that a water base resin advantageous from the viewpoint of explosion proof and environmental contamination is used, and it is preferred that a water-soluble resin and/or a water-dispersible resin is used as the above-described resin. A water soluble organic compound or a surface active agent may be used together for the water-soluble resin and/or the water-dispersible resin, and a resin made by a known method can be freely used.

Although the thickness of a coated layer is not particularly restricted, generally it is in the range of 0.001 to 1 μm, preferably in the range of 0.005 to 0.3 μm, more preferably in the range of 0.01 to 0.1 μm, and particularly preferably in the range of 0.02 to 0.07 μm. If the coated layer is too thick, there occurs a case where a deposited layer is whitened and glossiness thereof decreases when applied with heat of about 200° C. If the coated layer is too thin, there occurs a case where the adhesive property decreases. Further, the above-described range in thickness is preferred also from the viewpoint of recovery where the film is processed into chips and they are reused.

A layer of a coating material forming a coated layer is preferably applied in a process for manufacturing a biaxially oriented polyester film as described above, and in a case where a plurality of coating material layers are laminated in such a process, the adhesive property with a deposited layer, the glossiness of the formed coated layer and the adhesive property with an ink are all excellent, and therefore such a process is particularly preferred. Further, various additives such as organic or inorganic particles, lubricant, antistatic agent, weather resistant agent, thermal resistant agent, dye and pigment may be added in the coated layer as long as the advantages according to the present invention are not damaged.

A metal layer or a metal oxide layer may be provided on the above-described coated layer by a known deposition process. As a deposited metal, a single material of gold, silver, aluminium, silicon, palladium, nickel, cobalt, zinc, tin, titanium, indium, etc., or a mixture metal compound thereof, or a oxide thereof can be used.

Next, a process for producing a film according to the present invention will be explained hereunder. However, the process is not always restricted by the following process.

After PET containing so-called internally formed particles precipitated in the polymerization process and inorganic particles (for example, silica particles having a mean particle diameter of 1 μm) and having an intrinsic viscosity of 0.63 dl/g is dried by a regular method, it is melt-extruded, and a sheet-like molten material delivered out is cooled and solidified on a cooling drum to prepare a non-oriented PET film. The film is heated at a temperature of 80° to 120° C. while the film is stretched in the longitudinal direction at a draw ratio of 1.1 to 5.0 times to make a uniaxially oriented PET film. A corona discharge treatment is applied on one surface of the uniaxially oriented PET film, and on the treated surface, a melamine compound water mixing-system coating material is applied so as to control the thickness to a predetermined thickness. The method for application is not particularly restricted, and for example, a method using a rod coater, a gravure coater, a reverse coater or a roll coater can be employed. This film coated with the coating material is introduced into a tenter heated at a temperature of 90° to 140° C. while held by clips, and after or during drying, the film is stretched in the transverse direction at a draw ratio of 2.5 to 5.0 times and continuously heat treated in a heat treatment zone controlled at a temperature of 160° to 250° C. for a time of 1 to 10 seconds. During this heat treatment, as needed, a relaxation treatment may be performed at a relax of 0 to 12%. Thus, a polyester film provided with a coated layer formed from a mixture whose main constituents are a polyester resin and a melamine compound can be obtained.

Next, methods for determining the characteristics in the present invention and estimating the effects according to the present invention will be explained.

(1) Amount of carboxylic end group:

It was determined based on the method of Maurice. A polymer of 2 g was dissolved in o-cresol/chloroform (weight ratio: 7/3) of 50 ml, it was titrated using N/20-NaOH methanol solution, and the amount of carboxylic end group was determined as a value of eq/polyester $10^6$ g (that is, ton).

(2) Acid value (KOH mg/g):

The acid value was determined based on JIS-K3504. Namely, the amount of potassium hydroxide (mg) required to neutralize an acid contained in a sample of 1 g was determined.

(3) Parameter of surface roughness:

The parameter of surface roughness was measured using a high-accuracy level difference measuring apparatus for a thin film (ET-10 produced by Kosaka Kenkyusyo Corporation). Ra is the center line average height, and Rt is the maximum height and is represented by the distance between the highest and deepest peaks in the roughness curve. The measuring conditions were as follows, and the mean value of 20 measurements was defined as the parameter of surface roughness.

Radius of the tip of probe: 0.5 µm

Load of the probe: 5 mg

Measuring length: 1 mm

Cut off: 0.08 mm

An explanation of the respective parameters is given in, for example, "Method for determining and estimating surface roughness" by Jiro Nara (Sogo Gijutsu Center, 1983). Further, the meanings of Ra and Rt are defined in JIS-B-0601 and ISO-468-1982 (Rt is represented as Rmax in the JIS and as Ry in the ISO).

(4) Concentration of carboxylic acid at surface:

The concentration of carboxylic acid was determined under the following conditions using "ESCA-750" produced by Shimadzu Seisakusyo Corporation.

Excited X-ray: MgKα1,2 ray (1253.6 eV)

Photoelectron emission angle θ: 90°

Polyacrylic acid (PAA) was used as the standard sample. For both the standard sample and the measuring samples, the following gaseous chemical reaction was performed.

The sample films and the PAA film, which was the standard sample, were cut to a size of about 1 cm square, respectively, and the carboxylic acid present at their film surfaces was esterified by trifluoroethanol (TFE) using pyridine and dicyclohexylcarbodiimide (DCC) as the catalyst under a an air atmosphere in a desiccator. (The sample films and the PAA film were treated in an identical batch.)

The reaction rate (r) with TFE and the residual rate (m) of DCC used as the reaction catalyst were determined from the PAA standard sample, and the concentration of carboxylic acid at the surface of each sample film (—COOH/C [total]) was determined in consideration of "r" and "m" for the peak areas of $C_{1S}$ and $F_{1S}$ of each sample film.

(5) Concentration of primary amine at surface:

The concentration of primary amine was determined under the following conditions using "ESCA-750" produced by Shimadzu Seisakusyo Corporation.

Excited X-ray: MgKα1,2 ray (1253.6 eV)

Photoelectron emission angle θ: 90°

Diaminophenylether (DADPE) was used as the standard sample. For both the standard sample and the measuring samples, the following gaseous chemical reaction was performed.

The sample films and the DADPE film, which was the standard sample, were cut to a size of about 1 cm square, respectively, and the amino group present at their film surfaces was reacted with pentafluorobenzaldehyde (PFB) under an air atmosphere in a desiccator. (The sample films and the DADPE film were treated in an identical batch.)

The reaction rate (r) with PFB was determined from the DADPE standard sample, and the concentration of primary amine at the surface of each sample film (—NH$_2$/C [total]) was determined in consideration of "r" for the peak areas of $N_{1S}$ and $F_{1S}$ of each sample film.

(6) Adhesive property for deposited layer:

Al metal was deposited on the surface of the coated layer of a sample film using an electron beam heating type deposition apparatus so that the thickness of the deposited layer was in the range of 400 to 500 Å. Thereafter, a non-stretched polypropylene film (CPP) (thickness: 50 µm, "T3501" produced by Toray Gosei Film Corporation) was bonded on the deposited film using a polyurethane-based adhesive, and after the film was left in an atmosphere at a temperature of 40° C. for 48 hours, it was cut at a width of 15 mm. The delamination at an angle of 180° of the CPP and the deposited layer in the cut film was performed using a tensile tester and the delamination strength was measured at a delamination speed of 10 cm/min. The adhesive property for deposited layer was determined by this determination of the delamination strength. In a case where the delamination strength between the deposited layer and the coated layer is great, the delamination occurred at the interface between the CPP and the deposited layer. The delamination strength was determined in conditions of dry (under a condition of 25° C. and 50%RH) and waterproof adhesive property (under a condition where water was dropped into the delamination interface).

(7) Adhesive property for printing ink:

After nitrocellulose-based ink "CCST" produced by Toyo Ink Corporation was printed on the surface of the coated layer of a sample film using a gravure roll, the printed film was left in an atmosphere at a temperature of 40° C. and a relative humidity (RH) of 90% for 48 hours, and thereafter, the delamination test using a cellophane tape was performed. The standard for estimation is as follows.

Rank 5: The ink is not delaminated at all.

Rank 4: Less than 5% of the ink is delaminated onto the surface of the cellophane tape.

Rank 3: Not less than 5% and less than 10% of the ink is delaminated onto the surface of the cellophane tape.

Rank 2: Not less than 10% and less than 50% of the ink is delaminated onto the surface of the cellophane tape.

Rank 1: Not less than 50% of the ink is delaminated onto the surface of the cellophane tape.

(8) Printing suitability:

After nitrocellulose-based ink "CCST" produced by Toyo Ink Corporation was printed on the surface of the coated layer of a sample film using a gravure roll, the finish condition was observed and the printing suitability was determined based on the following standard.

○: Wrinkles and irregularity of printing do not occur.

X: Wrinkles, irregularity of printing and ink cissing occur.

(9) Thermal resistance:

An aluminum deposited film was treated by a heat sealer for one second, and the thermal resistance was determined by observation based on the following standard.

○: Whitening does not occur at a temperature of not higher than 220° C.
Δ: Whitening does not occur at a temperature of not higher than 215° C.
X: Whitening occurs at a temperature lower than 215° C.
(10) Stability of coated layer in film formation:

A coating material was applied using a rod coater on the film which had been uniaxially stretched and treated with a corona discharge treatment, the coated film was stretched and heat treated in a tenter, and thereafter, the coated layer formed on the film was observed and determined based on the following standard.
○: There is no problem at all.
Δ: There is slightly irregularity, but no problem.
X: There are irregularities and cracks. Coating is not uniformly performed.

EXAMPLES AND COMPARATIVE EXAMPLES

Preferred examples will be hereinafter explained together with comparative examples. The results of these examples and comparative examples are shown in Tables 1 to 3.

Example 1

After PET pellets (intrinsic viscosity: 0.64 dl/g) containing internally formed particles precipitated in the polymerization process and having a particle diameter of 0.5 to 1.5 μm and silica particles having a mean particle diameter of 1.0 μm was sufficiently vacuum dried, the pellets were supplied to an extruder and melt-extruded, and a sheet-like molten material delivered out was cast on a cooling drum with a surface temperature of 30° C. and cooled and solidified on the cooling drum. In order to improve the adhesive property between the sheet and the drum in this process, a wire electrode was disposed on the sheet side and a DC voltage of 6000 V was applied to the electrode. The non-stretched PET film thus obtained (amount of carboxylic end group: 42 eq/t) was heated at 95° C. and stretched in the longitudinal direction at a draw ratio of 3.5 times to prepare a uniaxially stretched film. A corona discharge treatment was performed on one surface of the film in the atmosphere, and a coating material prepared as follows was applied on the surface treated by the corona discharge treatment using a rod coater. The application thickness was controlled so that the thickness after finishing of orientation and crystallization was 0.05 μm.
(Composition of Coating Material)
Polyester resin A (acid value: 41 KOH mg/g, glass transition temperature (Tg): 20° C. ): 85 parts by weight containing the following components as the acid component;
terephthalic acid: 29 mol %,
isophthalic acid: 7 mol %,
trimellitic acid: 10 mol %,
sebasic acid: 3 mol %, and
containing the following components as the glycol component;
ethylene glycol: 14 mol %,
neopentyl glycol: 19 mol %,
1,4-butanediol: 18 mol %
N-methylol modified melamine compound (MW-12LF, produced by Sanwa Chemical Corporation): 15 parts by weight (solid component ratio)

The uniaxially stretched PET film coated with the coating material was introduced into a tenter heated at a temperature of 110° C. while held by clips, and after water component was removed by drying, the film was stretched in the transverse direction at a draw ratio of 3.5 times in a zone of the tenter heated at 120° C., and further, the film was heat treated in an atmosphere controlled at 225° C. for five seconds to obtain a polyester film having a film thickness of 12 μm and a coated layer thickness of 0.05 μm.

As the result of determination of the adhesive property for deposited layer, the adhesive property for printing ink, the printing suitability, etc., excellent properties could be obtained as shown in Table 1.

Example 2

A film having a film thickness of 12 μm and having a good adhesive coated layer with a thickness of 0.05 μm was obtained in a manner similar to that of Example 1 other than a condition where a resin prepared by mixing a copolymerized acrylic resin and a copolymerized polyester resin to a polyethylene terephthalate was used for the base film instead of the polyethylene terephthalate used in Example 1.

As the result of determination of the adhesive property for deposited layer, the adhesive property for printing ink, the printing suitability, etc., good properties could be obtained as shown in Table 1.

Example 3

A polyester film having a film thickness of 12 μm and having a good adhesive coated layer with a thickness of 0.05 μm was obtained in a manner similar to that of Example 1 other than a condition where a coating material composed of the polyester resin A used in Example 1 of 85 parts by weight, the N-methylol modified melamine compound used in Example 1 of 10 parts by weight and the following acrylic resin A of 5 parts by weight was used for the coated layer.
Acrylic resin A: MMA/EA/AA/N-MAM copolymerized acrylic
MMA: methylmethacrylate
EA: ethylacrylate
AA acrylic acid
N-MAM: N-methylolacrylamide As the result of determination of the adhesive property for deposited layer, the adhesive property for printing ink, the printing suitability, etc., excellent properties could be obtained as shown in Table 1.

Example 4

A polyester film having a film thickness of 12 μm and having a good adhesive coated layer with a thickness of 0.05 μm was obtained in a manner similar to that of Example 3 other than a condition where a coating material composed of the polyester resin A of 70 parts by weight, the N-methylol modified melamine compound of 25 parts by weight and the above-described acrylic resin A of 5 parts by weight was used for the coated layer.

As the result of determination of the adhesive property for deposited layer, the adhesive property for printing ink, the printing suitability, etc., good properties could be obtained as shown in Table 1.

Example 5

A polyester film was obtained in a manner similar to that of Example 1 other than a condition where the amount of carboxylic end group of the polyester for the base film used in Example was changed to 30 eq/t.

As the result of determination of the adhesive property for deposited layer, the adhesive property for printing ink, the printing suitability, etc., good properties could be obtained as shown in Table 1.

Example 6

A polyester film having a film thickness of 12 µm and having a good adhesive coated layer with a thickness of 0.05 µm was obtained in a manner similar to that of Example 1 other than a condition where the mixing ratio of the polyester resin A and the N-methylol modified melamine compound used in Example 1 in a coating material was changed to 70/30.

As the result of determination of the adhesive property for deposited layer, the adhesive property for printing ink, the printing suitability, etc., good properties could be obtained as shown in Table 1.

Example 7

A polyester film having a film thickness of 12 µm and having a good adhesive coated layer with a thickness of 0.05 µm was obtained in a manner similar to that of Example 1 other than a condition where the mixing ratio of the polyester resin A and the N-methylol modified melamine compound used in Example 1 in a coating material was changed to 97/3.

As the result of determination of the adhesive property for deposited layer, the adhesive property for printing ink, the printing suitability, etc., extremely excellent properties could be obtained as shown in Table 1.

Example 8

A polyester film having a film thickness of 12 µm and having a good adhesive coated layer with a thickness of 0.05 µm was obtained in a manner similar to that of Example 1 other than a condition where the mixing ratio of the polyester resin A and the N-methylol modified melamine compound used in Example 1 in a coating material was changed to 90/10.

As the result of determination of the adhesive property for deposited layer, the adhesive property for printing ink, the printing suitability, etc., extremely excellent properties could be obtained as shown in Table 1.

Example 9

A polyester film having a film thickness of 12 µm and having a good adhesive coated layer with a thickness of 0.05 µm was obtained in a manner similar to that of Example 1 other than a condition where the mixing ratio of the polyester resin A and the N-methylol modified melamine compound used in Example 1 in a coating material was changed to 95/5. In the surface of the coated layer of the obtained polyester film, the concentration of carboxylic acid was 0.013 and the concentration of primary amine was 0.003.

As the result of determination of the adhesive property for deposited layer, the adhesive property for printing ink, the printing suitability, etc., particularly excellent properties could be obtained as shown in Table 1.

Example 10

A polyester film having a film thickness of 12 µm and having a good adhesive coated layer with a thickness of 0.05 µm was obtained in a manner similar to that of Example 9 other than a condition where the polyester resin A was changed to a polyester resin B having an acid value of 10 KOH mg/g. In the surface of the coated layer of the obtained polyester film, the concentration of carboxylic acid was 0.004 and the concentration of primary amine was 0.003.

As the result of determination of the adhesive property for deposited layer, the adhesive property for printing ink, the printing suitability, etc., good properties could be obtained as shown in Table 1.

Example 11

A polyester film having a film thickness of 12 µm and having a good adhesive coated layer with a thickness of 0.05 µm was obtained in a manner similar to that of Example 1 other than a condition where the mixing ratio of the polyester resin A and the N-methylol modified melamine compound used in Example 1 in a coating material was changed to 99/1. In the surface of the coated layer of the obtained polyester film, the concentration of carboxylic acid was 0.017 and the concentration of primary amine was 0.0005.

As the result of determination of the adhesive property for deposited layer, the adhesive property for printing ink, the printing suitability, etc., good properties could be obtained as shown in Table 1.

Example 12

A polyester film having a film thickness of 12 µm was obtained in a manner similar to that of Example 9 other than a condition where the thickness of the coated layer of Example 9 was changed to 0.1 µm. In the surface of the coated layer of the obtained polyester film, the concentration of carboxylic acid was 0.015 and the concentration of primary amine was 0.003.

As the result of determination of the adhesive property for deposited layer, the adhesive property for printing ink, the printing suitability, etc., excellent properties could be obtained as shown in Table 1.

Example 13

A polyester film having a film thickness of 12 µm and having a good adhesive coated layer with a thickness of 0.05 µm was obtained in a manner similar to that of Example 1 other than a condition where a polyester resin C (acid value: 69 KOH mg/g, Tg: 70° C.) was used instead of the polyester resin A used in Example 1. The polyester resin C was prepared by reacting terephthalic acid of 0.4 mol, isophthalic acid of 0.4 mol and ethylene glycol of 1.1 mol at a temperature of 130° C. for 13 hours under a condition of presence of a catalyst while removing the distillate to prepare a prepolymer, charging trimellitic anhydride of 0.2 mol % thereinto and reacting them at a temperature of 160° C. for three hours.

As the result of determination of the adhesive property for deposited layer, the adhesive property for printing ink, the printing suitability, etc., excellent properties could be obtained as shown in Table 1.

Example 14

A polyester film was obtained in a manner similar to that of Example 13 other than a condition where the polyester resin C was changed to a polyester resin D having an acid value of 112 KOH mg/g.

As the result of determination of the adhesive property for deposited layer, the adhesive property for printing ink, the printing suitability, etc., excellent properties could be obtained as shown in Table 2.

Example 15

A polyester film was obtained in a manner similar to that of Example 9 other than a condition where the polyester resin A was changed so that the amount of the sulfonic group was 1 mol %.

As the result of determination of the adhesive property for deposited layer, the adhesive property for printing ink, the printing suitability, etc., excellent properties could be obtained as shown in Table 2.

Example 16

A polyester film was obtained in a manner similar to that of Example 9 other than a condition where the polyester resin A was changed so that the amount of the trimellitic acid was 35 mol %.

As the result of determination of the adhesive property for deposited layer, the adhesive property for printing ink, the printing suitability, etc., excellent properties could be obtained as shown in Table 2.

Example 17

A polyester film was obtained in a manner similar to that of Example 9 other than a condition where the composition of the polyester resin A was changed so that the glass transition temperature Tg was −10° C.

As the result of determination of the adhesive property for deposited layer, the adhesive property for printing ink, the printing suitability, etc., good properties could be obtained as shown in Table 2.

Example 18

A polyester film was obtained in a manner similar to that of Example 13 other than a condition where the composition of the polyester resin C was changed so that the glass transition temperature Tg was 90° C.

As the result of determination of the adhesive property for deposited layer, the adhesive property for printing ink, the printing suitability, etc., good properties could be obtained as shown in Table 2.

Example 19

A polyester film having a film thickness of 12 μm was obtained in a manner similar to that of Example 9 other than a condition where the thickness of the coated layer of Example 9 was changed to 0.5 μm.

As the result of determination of the adhesive property for deposited layer, the adhesive property for printing ink, the printing suitability, etc., excellent properties could be obtained as shown in Table 2.

Example 20

A polyester film having a film thickness of 12 μm was obtained in a manner similar to that of Example 9 other than a condition where the thickness of the coated layer of Example 9 was changed to 0.03 μm.

As the result of determination of the adhesive property for deposited layer, the adhesive property for printing ink, the printing suitability, etc., extremely excellent properties could be obtained as shown in Table 2.

Example 21

A polyester film having a film thickness of 12 μm was obtained in a manner similar to that of Example 9 other than a condition where the thickness of the coated layer of Example 9 was changed to 0.07 μm.

As the result of determination of the adhesive property for deposited layer, the adhesive property for printing ink, the printing suitability, etc., extremely excellent properties could be obtained as shown in Table 2.

Example 22

A polyester film having a film thickness of 12 μm was obtained in a manner similar to that of Example 9 other than a condition where the thickness of the coated layer of Example 9 was changed to 0.004 μm.

As the result of determination of the adhesive property for deposited layer, the adhesive property for printing ink, the printing suitability, etc., excellent properties could be obtained as shown in Table 2.

Example 23

A polyester film having a film thickness of 12 μm and having a good adhesive coated layer with a thickness of 0.07 μm was obtained in a manner similar to that of Example 1 other than a condition where the polyester resin A used in Example 1 was changed to an acrylic graft polyester resin and the mixing ratio of the acrylic graft polyester resin and the N-methylol modified melamine compound used in Example 1 in a coating material was set to 95/5. In the surface of the coated layer of the obtained polyester film, the concentration of carboxylic acid was 0.015 and the concentration of primary amine was 0.0025.

As the result of determination of the adhesive property for deposited layer, the adhesive property for printing ink, the printing suitability, etc., excellent properties could be obtained as shown in Table 2.

Example 24

A polyester film having a film thickness of 12 μm and Rt/Ra of 28 in the surface of the coated layer was obtained in a manner similar to that of Example 9 other than a condition where the particles contained in the polyester of the base film of Example 9 was changed and the thickness of the coated layer was changed to 0.04 μm.

As the result of determination of the adhesive property for deposited layer, the adhesive property for printing ink, the printing suitability, etc., excellent properties could be obtained as shown in Table 2.

Example 25

A polyester film having a film thickness of 12 μm and Rt/Ra of 58 in the surface of the coated layer was obtained in a manner similar to that of Example 24 other than a condition where the particles contained in the polyester of the base film of Example 24 was changed.

As the result of determination of the adhesive property for deposited layer, the adhesive property for printing ink, the printing suitability, etc., good properties could be obtained as shown in Table 2.

Example 26

A polyester film having a film thickness of 12 μm and Rt/Ra of 8.2 in the surface of the coated layer was obtained in a manner similar to that of Example 24 other than a condition where the particles contained in the polyester of the base film of Example 24 was changed.

As the result of determination of the adhesive property for deposited layer, the adhesive property for printing ink, the printing suitability, etc., good properties could be obtained as shown in Table 2, but the handling ability was poor.

Example 27

A polyester film having a film thickness of 12 μm was obtained in a manner similar to that of Example 24 other than a condition where the amount of carboxylic end group in the polyester of the base film of Example 24 was 32 eq/t.

As the result of determination of the adhesive property for deposited layer, the adhesive property for printing ink, the printing suitability, etc., good properties could be obtained as shown in Table 2.

Comparative Example 1

A biaxially oriented PET film was obtained in a manner similar to that of Example 1 other than a condition where a coated layer was not provided. As the result of determination of the obtained film, as shown in Table 3, the waterproof adhesive property was quite poor, and not only it was easily delaminated from the interface between PET and Al but the adhesive property for printing ink was also poor.

Comparative Example 2

A polyester film was obtained in a manner similar to that of Example 1 other than a condition where a coated layer was formed only from the acrylic resin A used in Example 3.

As the result of determination of the adhesive property for deposited layer, the adhesive property for printing ink, the printing suitability, etc., the waterproof adhesive property was quite poor and the adhesive property for printing ink was also poor as shown in Table 3.

Comparative Example 3

A polyester film was obtained in a manner similar to that of Example 1 other than a condition where a coated layer was formed only from the following acrylic resin B. In the surface of the coated layer of the obtained polyester film, the concentration of carboxylic acid was 0.017 and the concentration of primary amine was 0.

As the result of determination of the adhesive property for deposited layer, the adhesive property for printing ink, the printing suitability, etc., the waterproof adhesive property was quite poor and the adhesive property for printing ink was also poor as shown in Table 3.

Acrylic resin B: MMA/BA/AA/AN copolymerized acrylic
  MMA methylmethacrylate
  BA: butylacrylate
  AA: acrylic acid
  AN: acrylonitrile Comparative Example 4

A polyester film was obtained in a manner similar to that of Example 1 other than a condition where a coated layer was formed only from the polyester C used in Example 13.

As the result of determination of the adhesive property for deposited layer, the adhesive property for printing ink, the printing suitability, etc., the waterproof adhesive property was quite poor and the adhesive property for printing ink was also poor as shown in Table 3.

Comparative Example 5

A polyester film was obtained in a manner similar to that of Example 1 other than a condition where a coated layer was formed only from the polyester D used in Example 14.

As the result of determination of the adhesive property for deposited layer, the adhesive property for printing ink, the printing suitability, etc., as shown in Table 3, the waterproof adhesive property was quite poor, and not only it was easily delaminated from the interface between PET and Al but the adhesive property for printing ink was also poor.

Comparative Example 6

A polyester film was obtained in a manner similar to that of Example 1 other than a condition where the melamine compound used in Example 1 was changed to an oxazoline compound.

As the result of determination of the adhesive property for deposited layer, the adhesive property for printing ink, the printing suitability, etc., not only the waterproof adhesive property was poor but also the adhesive property for printing ink decreased as shown in Table 3.

Comparative Example 7

A polyester film was obtained in a manner similar to that of Example 1 other than a condition where the melamine compound used in Example 1 was changed to an isocyanate compound.

As the result of determination of the adhesive property for deposited layer, the adhesive property for printing ink, the printing suitability, etc., not only the waterproof adhesive property was poor but also the adhesive property for printing ink decreased as shown in Table 3.

Comparative Example 8

A polyester firm was obtained in a manner similar to that of Example 1 other than a condition where the polyester resin A used in Example 1 was changed to the acrylic resin B used in Comparative Example 3.

As the result of determination of the adhesive property for deposited layer, the adhesive property for printing ink, the printing suitability, etc., the waterproof adhesive property was quite poor and the adhesive property for printing ink was also poor as shown in Table 3.

TABLE 1

|  | Adhesive property for deposited layer (g/15 mm) | | Water-proof adhesive property | Adhesive property for ink | Printing suitability | Thermal resistance | Stability of coated layer |
| --- | --- | --- | --- | --- | --- | --- | --- |
|  | dry | | | | | | |
| Example 1 | 350 | | 140 | 4 | ○ | ○ | ○ |
| Example 2 | 230 | | 110 | 3 | ○ | ○ | Δ |
| Example 3 | 340 | | 150 | 4 | ○ | ○ | ○ |
| Example 4 | 245 | | 105 | 3 | ○ | Δ | Δ |
| Example 5 | 225 | | 100 | 3 | ○ | Δ | ○ |
| Example 6 | 220 | | 105 | 3 | ○ | Δ | ○ |
| Example 7 | ≧500 | | 315 | 5 | ○ | ○ | ○ |
| Example 8 | ≧500 | | 325 | 5 | ○ | ○ | ○ |
| Example 9 | ≧500 | | ≧350 | 5 | ○ | ○ | ○ |
| Example 10 | 350 | | 125 | 4 | ○ | ○ | ○ |
| Example 11 | 360 | | 115 | 4 | ○ | ○ | ○ |
| Example 12 | ≧500 | | 300 | 5 | ○ | ○ | ○ |
| Example 13 | 360 | | 105 | 4 | ○ | ○ | ○ |

TABLE 2

| | Adhesive property for deposited layer (g/15 mm) | | | | | |
|---|---|---|---|---|---|---|
| | dry | Waterproof adhesive property | Adhesive property for ink | Printing suitability | Thermal resistance | Stability of coated layer |
| Example 14 | 480 | 115 | 4 | ○ | ○ | ○ |
| Example 15 | 450 | 145 | 4 | ○ | ○ | ○ |
| Example 16 | 400 | 160 | 4 | ○ | ○ | Δ |
| Example 17 | 370 | 115 | 4 | ○ | Δ | ○ |
| Example 18 | 330 | 100 | 4 | ○ | ○ | Δ |
| Example 19 | 440 | 270 | 4 | ○ | ○ | Δ |
| Example 20 | ≧500 | ≧350 | 5 | ○ | ○ | ○ |
| Example 21 | ≧500 | ≧350 | 5 | ○ | ○ | ○ |
| Example 22 | 310 | 115 | 4 | ○ | ○ | ○ |
| Example 23 | 345 | 140 | 4 | ○ | Δ | ○ |
| Example 24 | ≧500 | ≧350 | 5 | ○ | ○ | ○ |
| Example 25 | 440 | 290 | 4 | ○ | ○ | ○ |
| Example 26 | 480 | 305 | 5 | ○ | ○ | ○ |
| Example 27 | 405 | 275 | 4 | ○ | ○ | ○ |

TABLE 3

| | Adhesive property for deposited layer (g/15 mm) | | | |
|---|---|---|---|---|
| | dry | Waterproof adhesive property | Adhesive property for ink | Printing suitability |
| Comparative Example 1 | ≦30 | ≦30 | 1 | X |
| Comparative Example 2 | ≦30 | ≦30 | 1 | X |
| Comparative Example 3 | ≦30 | ≦30 | 1 | X |
| Comparative Example 4 | 45 | ≦30 | 1 | X |
| Comparative Example 5 | 55 | ≦30 | 1 | X |
| Comparative Example 6 | 105 | ≦30 | 2 | X |
| Comparative Example 7 | 120 | 40 | 3 | X |
| Comparative Example 8 | 50 | ≦30 | 2 | X |

As described hereinabove, in the present invention, by forming a coated layer from a mixture whose main constituents are a polyester resin and a melamine compound and forming not less than 60 wt % of the constituents of the coated layer from the polyester resin, or by controlling the concentration of carboxylic acid to not less than 0.005 and the concentration of primary amine to not less than 0.0015, the adhesive property for a deposited layer under a high-moisture condition, particularly, in water, and the adhesive property for a printing ink can be remarkably improved.

Although preferred embodiments of the present invention have been described in detail herein, the invention is not limited thereto. It will be appreciated by those skilled in the art that various modifications may be made without materially departing from the novel and advantageous teachings of the invention. Accordingly, the embodiments disclosed herein are by way of example. It is to be understood that the scope of the invention is not to be limited thereby, but is to be determined by the claims which follow.

What is claimed is:

1. A packaging film having a good adhesive property comprising:
    a polyester resin base film; and
    a coated layer formed on at least one surface of said base film, said coated layer comprising a mixture of a polyester resin and a melamine compound, wherein said polyester resin comprises at least about 60% by weight of said coated layer, wherein said polyester resin has an acid value of not less than 20 KOH mg/g.

2. A film having a good adhesive property according to claim 1, wherein 0.01% to 30% by weight of constituents forming said coated layer is said melamine compound.

3. A film having a good adhesive property according to claim 2, wherein said coated layer is composed of said polyester resin and said melamine compound, and the weight ratio of said polyester resin to said melamine compound is in the range of 99/1 to 80/20.

4. A film having a good adhesive property according to claim 1, wherein the amount of a sulfonic group contained in a molecule of said polyester resin forming said coated layer is not more than 0.5 mol %.

5. A film having a good adhesive property according to claim 1, wherein said polyester resin forming said coated layer contains a trimellitic acid.

6. A film having a good adhesive property according to claim 1, wherein the glass transition temperature of said polyester resin forming said coated layer is in the range of 0° C. to 80° C.

7. A film having a good adhesive property according to claim 1, wherein the thickness of said coated layer is in the range of 0.001 to 1 μm.

8. A film having a good adhesive property according to claim 1, wherein a surface roughness parameter Rt/Ra of the surface of said coated layer is in the range of 10 to 50.

9. A film having a good adhesive property according to claim 1, wherein the amount of a carboxylic end group of said polyester resin composition forming said base film is not less than 37 eq/t.

10. A film having a good adhesive property according to claim 1 further comprising a layer of a metal or a metal oxide on said coated layer.

11. The film having a good adhesive property according to claim 10, wherein said layer of a metal or a metal oxide is added by vacuum deposition.

12. A film having a good adhesive property according to claim 1 or 10 further comprising a layer of ink provided on said coated layer.

13. A packaging film having a good adhesive property comprising:
    a base film; and
    a coated layer having carboxylic acid and a primary amine on its surface, said layer being formed on at least one surface of sid base film, the concentration of said carboxylic acid of the surface of said coated layer, expressed as the ratio —COOH/C (total), being not less than 0.005 and the concentration of said primary amine of the surface of said coated layer, expressed as the ratio —NH$_2$/C (total), being not less than 0.0015.

14. A film having a good adhesive property according to claim 13, wherein said base film comprises a polyester resin composition.

15. A film having a good adhesive property according to claim 13, wherein 0.01% to 30% by weight of constituents forming said coated layer is a melamine compound.

16. A film having a good adhesive property according to claim 15, wherein said coated layer is composed of a polyester resin and said melamine compound, and the weight ratio of said polyester resin to said melamine compound is in the range of 99/1 to 80/20.

17. A film having a good adhesive property according to claim 13, wherein said coated layer contains a polyester resin, and the acid value of said polyester resin forming said coated layer is not less than 20 KOH mg/g.

18. A film having a good adhesive property according to claim 13, wherein said coated layer contains a polyester resin, and the amount of a sulfonic group contained in a molecule of said polyester resin forming said coated layer is not more than 0.5 mol %.

19. A film having a good adhesive property according to claim 13, wherein said coated layer contains a polyester resin, and said polyester resin forming said coated layer contains a trimellitic acid.

20. A film having a good adhesive property according to claim 13, wherein said coated layer contains a polyester resin, and the glass transition temperature of said polyester resin forming said coated layer is in the range of 0° C. to 80° C.

21. A film having a good adhesive property according to claim 13, wherein the thickness of said coated layer is in the range of 0.001 to 1 µm.

22. A film having a good adhesive property according to claim 13, wherein a surface roughness parameter Rt/Ra of the surface of said coated layer is in the range of 10 to 50.

23. A film having a good adhesive property according to claim 14, wherein the amount of a carboxylic end group of said polyester resin composition forming said base film is not less than 37 eq/t.

24. A film having a good adhesive property according to claim 13 further comprising a layer of a metal or a metal oxide on said coated layer.

25. A film having a good adhesive property according to claim 24, wherein said layer of a metal or a metal is added by deposition.

26. A film having a good adhesive property according to claim 13 or 24 further comprising a layer of an ink on said coated layer.

27. A film having a good adhesive property according to claim 13, wherein said film is used for packaging.

28. A process for producing a polyester resin composition packaging film having a good adhesive property comprising the steps of:

applying a coating material on at least one surface of a base film which has not yet been oriented and crystallized, said coating material comprising a mixture whose main constituents are a polyester resin and a melamine compound; and orienting and crystallizing said base film with a coated layer by stretching said base film with said coated layer in at least one direction and heat treating it, wherein the acid value of said polyester resin forming said coated layer is not less than 20 KOH mg/g.

29. The process according to claim 28, wherein 0.01% to 30% by weight of constituents forming said coated layer is said melamine compound.

30. The process according to claim 28, wherein the amount of a sulfonic group contained in a molecule of said polyester resin forming said coated layer is not more than 0.5 mol %.

31. The process according to claim 28, wherein said polyester resin forming said coated layer contains a trimellitic acid.

32. A process for producing a packaging film having a good adhesive property comprising the steps of:

applying a coating material on at least one surface of a base film which is capable of being but has not yet been oriented and crystallized; and orienting and crystallizing said base film and said coated layer by stretching said base film with said coated layer in at least one direction and heat treating it, as well as forming a coated layer having a concentration of a carboxylic acid at its surface, expressed as the ratio —COOH/C (total) of not less than 0.005 and a concentration of a primary amine at its surface, expressed as the ratio —NH$_2$/C (total) of not less than 0.0015.

33. The process according to claim 32, wherein said base film comprises a polyester resin composition.

34. The process according to claim 32, wherein 0.01% to 30% by weight of constituents forming said coated layer is a melamine compound.

35. The process according to claim 32, wherein said coated layer contains a polyester resin, and the acid value of said polyester resin forming said coated layer is not less than 20 KOH mg/g.

36. The process according to claim 32, wherein said coated layer contains a polyester resin, and the amount of a sulfonic group contained in a molecule of said polyester resin forming said coated layer is not more than 0.5 mol %.

37. The process according to claim 32, wherein said coated layer contains a polyester resin, and said polyester resin forming said coated layer contains a trimellitic acid.

* * * * *